H. HOWARD.
PROCESS OF MAKING MINERAL ACIDS.
APPLICATION FILED JULY 13, 1914.
1,193,552.
Patented Aug. 8, 1916.
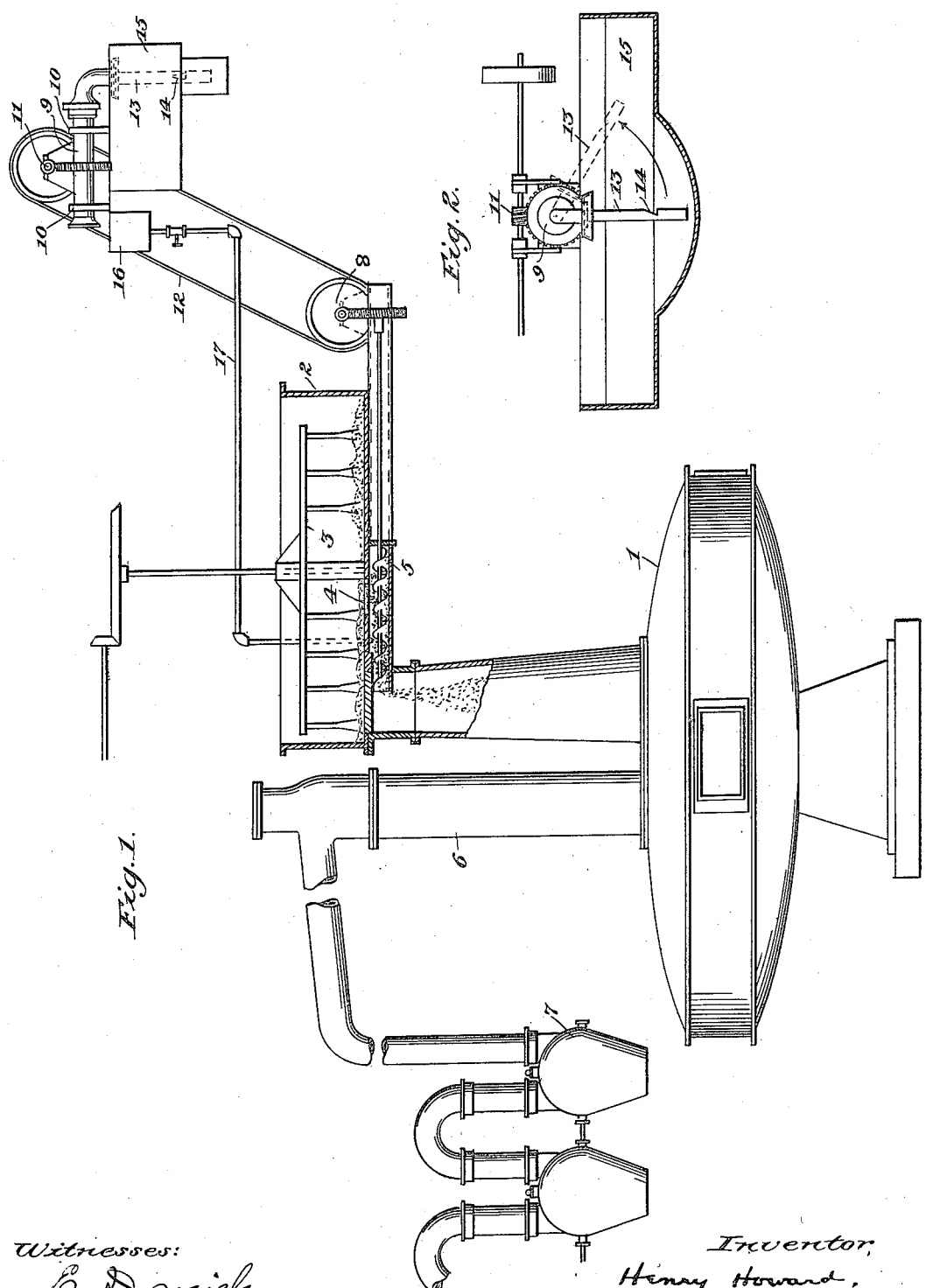

UNITED STATES PATENT OFFICE.

HENRY HOWARD, OF BROOKLINE, MASSACHUSETTS.

PROCESS OF MAKING MINERAL ACIDS.

1,193,552.  Specification of Letters Patent.  Patented Aug. 8, 1916.

Application filed July 13, 1914. Serial No. 850,674.

*To all whom it may concern:*

Be it known that I, HENRY HOWARD, a citizen of the United States, residing at Brookline, in the county of Norfolk and State of Massachusetts, have invented certain new and useful Improvements in Processes of Making Mineral Acids, of which the following is a specification.

This invention relates to processes of making nitric and hydrochloric acids, a primary object of the invention being to secure a better control and adjustment as between the successive stages of such processes.

The invention also contemplates a novel process of making hydrochloric acid.

In processes of this kind, nitric acid is first prepared by reacting upon sodium nitrate with sulfuric acid under conditions to yield acid sodium sulfate as a by-product, according to the equation—

(1) 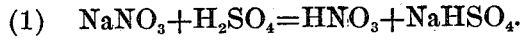

In the second stage of the process, hydrochloric acid is prepared by reaction between the acid sodium sulfate produced in the first stage, and sodium chlorid according to the equation—

(2) 

The final products are nitric and hydrochloric acids and normal sodium sulfate, all of which are marketable.

It is obvious that the complete process necessitates a definite adjustment as between the quantities of nitric and hydrochloric acids produced, inasmuch as the acid sodium sulfate of the first stage is employed to decompose the sodium chlorid in the second stage. This adjustment is not easily maintained in continuous operation whether one or several furnaces are used in the respective stages of the process; and the proper adjustment is usually obtained by intermittent and hence uneconomical operation of one or more of the furnaces, in order to secure the proper balance in their output.

According to the present invention, the necessary adjustment is maintained and the process rendered continuous in character, by feeding accurately measured quantities of sulfuric acid to the hydrochloric acid furnace or furnaces, or preferably to the charge prepared for such furnaces. These hydrochloric acid furnaces, which are of the mechanical salt-cake type, are given a larger capacity than the nitric acid furnace or furnaces. By proceeding in this way, it becomes possible to utilize both furnaces or sets of furnaces in a continuous manner and at their normal capacity: for the hydrochloric acid furnaces receive the total output of acid sodium sulfate from the nitric acid furnaces and also a supplemental quantity of sodium chlorid sufficient for their normal operation, the deficiency in the amount of acid sodium sulfate being supplied by equivalent, and if necessary varying, additions of sulfuric acid.

An apparatus suitable for carrying out the invention is shown in the accompanying drawings, wherein—

Figure 1 is a side elevation, partly in section, of a Mannheim furnace for the production of hydrochloric acid and salt cake, with appropriate feeding and absorption devices; and Fig. 2 is a transverse sectional view of the acid-feeding device shown in Fig. 1.

In said drawings, 1 represents, diagrammatically, a mechanical salt-cake furnace of the Mannheim type, which in practice is provided with the usual stirring means and is constructed for continuous operation.

2 is the salt pan, which receives the acid sodium sulfate from the nitric acid furnaces, together with an excess of sodium chlorid, preferably in the condition of fine powder. The salt pan 2 is provided with a rotary mixing and feeding mechanism 3 and discharges through the bottom outlet 4 into a conveyer 5 which leads directly to the furnace 1. The gases evolved from the furnace pass through the standard 6 to a suitable absorption train 7. The conveyer 5 is shown as operated by means of a worm-gear 8.

In the apparatus illustrated, sulfuric acid in the required proportion to supply the predetermined deficiency of acid sodium sulfate, is fed in successive equal portions to the conveyer 5 at a point between the salt pan and the mechanical furnace. A suitable mechanism for feeding the acid in this manner comprises a horizontal cylinder 9 of acid-proof ware, revolubly mounted in bearings 10 and slowly rotated by a worm-gear 11, the arrangement being such that the conveyer 5 and the cylinder 9, interconnected through the belt 12, are always driven in synchronism. The cylinder 9 carries at one end a dipping tube 13 which revolves in a vertical plane in the direction indicated by the arrow in Fig. 2. This tube is closed at its outer end and is provided on its advancing side with an aperture 14, which is preferably angular, and which extends to, but not beyond, the median plane of the tube. This tube discharges into the cylinder 9 as it reaches the horizontal position in its movement of rotation, and delivers equal quantities of acid at each revolution, irrespective of the depth of acid in the tank 15, provided enough acid be present to fill the cup end of the tube in its lowermost position. The acid is discharged at each revolution into a small receiving vessel 16, whence it is carried by pipe 17 to the conveyer 5. By operating the dipping tube in synchronism with the mechanical conveyer for the salt, and properly proportioning the capacity and rate of revolution of the tube to the capacity of the conveyer, taking into proper account the proportion of sodium chlorid and acid sodium sulfate in the mixture contained in the pan 2, it is practicable to deliver the proper mixture of sodium chlorid, acid sodium sulfate and sulfuric acid to the furnace under all conditions and at a controllable rate.

The acid-feeding device as above described, is claimed in my copending application Serial No. 848,457, filed July 1, 1914. Instead of this particular form of acid feed, I may employ other devices capable of accomplishing a like result.

In the operation of this apparatus, the pan 2 serves as a storage receptacle for the solid constituents of the charge and the conveyer mixes these solid constituents and the necessary proportion of acid to a substantially uniform paste, while the body of solid material in the pan and in the rear of the conveyer acts as an effective seal to prevent any escape of the gaseous hydrochloric acid. The gas set free by the partial decomposition occurring in the conveyer, passes into the furnace with the partially decomposed mixture, and thence, together with the reaction gases from the furnace to the absorption train 7.

The invention is not restricted to the employment of the particular apparatus illustrated. For example, if desired, I may supply salt, acid sodium sulfate, and sulfuric acid in weighed proportionate quantities directly to the mixing-pan 2 which in such case, should be constructed of a material resistant to hydrochloric acid, properly covered, and directly piped to the absorption system.

Any necessary variation in the rate of supply of sulfuric acid, may be effected either by replacing the dipping-tube 13 by a tube of larger or smaller capacity, as may be required, or by providing any convenient means for varying the capacity of the cup-end of the tube.

I claim:—

In a process of making nitric acid and hydrochloric acids, the method of effecting an adjustment between the nitric and hydrochloric acid furnaces, the latter of greater capacity than the former, which consists in producing nitric acid and acid sodium sulfate by reaction between sodium nitrate and sulfuric acid, mixing the acid sodium sulfate residue from the nitric acid furnaces with an excess of sodium chlorid, supplying sulfuric acid in proportion to compensate the deficiency of acid sulfate and to produce normal sodium sulfate, and stirring and heating the mixture.

In testimony whereof I affix my signature in presence of two witnesses.

HENRY HOWARD.

Witnesses:
 I. M. GRAHAM,
 MAE V. O'BRIEN.